United States Patent [19]

Bettenhausen

[11] Patent Number: 5,368,424
[45] Date of Patent: Nov. 29, 1994

[54] SURFACING TOOL

[76] Inventor: Jerome H. Bettenhausen, 902 49 Ave Pla., Greeley, Colo. 80634

[21] Appl. No.: 43,209

[22] Filed: Apr. 5, 1993

[51] Int. Cl.$^5$ .............................................. B27C 1/02
[52] U.S. Cl. .................................... 409/182; 409/204; 30/477; 30/DIG. 1; 144/134 D; 144/136 C
[58] Field of Search ................... 30/276, 79, 169, 172, 30/477, 483, 500, 475, 476, DIG. 1; 51/72 L; 144/118, 134 D, 136 C; 408/16, 241 S; 409/175, 181, 182, 184, 204

[56] References Cited

U.S. PATENT DOCUMENTS

| | | | |
|---|---|---|---|
| 1,643,882 | 9/1927 | Faiver | 30/477 X |
| 2,395,158 | 2/1946 | Yandell | 30/477 |
| 2,780,966 | 2/1957 | Frost et al. | 144/134 D X |
| 2,894,594 | 7/1959 | Garland | 30/475 |
| 3,443,479 | 5/1969 | Hawley et al. | 409/182 |
| 3,487,747 | 1/1970 | Burrows et al. | 144/134 D X |
| 3,489,191 | 1/1970 | Blevins | 144/134 D X |
| 3,935,788 | 2/1976 | Gilmore | 144/134 D X |
| 4,056,136 | 11/1977 | Miller | 144/136 C X |
| 4,723,911 | 2/1988 | Kurtz | 408/16 X |
| 5,265,657 | 11/1993 | Matsumoto et al. | 409/182 X |

FOREIGN PATENT DOCUMENTS 113484  3/1945  Sweden ........................ 408/241 S

*Primary Examiner*—Rinaldi I. Rada
*Assistant Examiner*—Clark F. Dexter

[57] ABSTRACT

The present invention provides a small, portable hand-held tool having a rotating cutter blade therein. The blade is adjustable to extend within to a very small degree above the base of the tool to engage and trim off such imperfections in the surface of the paint job without cutting into the surface itself. In its preferred embodiment, the present invention contains a lubricant dispenser for providing lubricant to the surface being treated and may include a light source to aid in detecting imperfections.

1 Claim, 4 Drawing Sheets

SURFACING TOOL

BACKGROUND OF THE INVENTION

1. Field of the Invention

The present invention relates to auto body finishing and more particularly pertains to an apparatus and method which may be used to correct small imperfections or occluded dirt particles in a painted surface.

2. Description of the Prior Art

The use of small battery powered tools is known in the prior art. More specifically, most of such tools heretofore devised and utilized for the purpose of drilling, cutting or the like are known to consist basically of familiar, expected and obvious structural configurations, notwithstanding the myriad of designs encompassed by the crowded prior art which have been developed for the fulfillment of countless objectives and requirements. Typical of such tools of those illustrated in U.S. Pat. Nos. 3,905,429; 4,930,853; 5,042,592; 4,958,432; and 4,932,294.

Most of such tools used for surfacing paint or the like contact the surface directly and will mar the painted surface while sanding or grinding off imperfections thereon.

In this respect, the surfacing device according to the present invention substantially departs from the conventional concepts and designs of the prior art, and in so doing provides an apparatus primarily developed for the purpose of treating a freshly painted surface containing occluded imperfections to remove the same without damaging such surface.

Therefore, it can be appreciated that there exists a continuing need for new and improved devices which can be used for treating such painted surfaces. In this regard, the present invention substantially fulfills this need.

SUMMARY OF THE INVENTION

In view of the foregoing disadvantages inherent in the known types of automotive paint finishing devices now present in the prior art, the present invention provides an improved surfacing tool construction wherein the same can be utilized for treating a painted surface to remove imperfections from such surface. As such, the general purpose of the present invention, which will be described subsequently in greater detail, is to provide a new and improved surface treating apparatus and method which has all the advantages of the prior art devices and none of the disadvantages.

To attain this, the present invention essentially comprises a small, powered, hand-held, adjustable rotating cutter adapted to be applied to the surface to be treated with the cutter head projecting in a controlled fashion within or just above the surface of the tool base to engage and cut-off any minor projections from the surface to be treated. Preferably, means are provided to lubricate the surface being treated and the tool may contain a light source to high light imperfections in such surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved surfacing tool which has all the advantages of the prior art devices and none of the disadvantages.

It is another object of the present invention to provide a new and improved surfacing tool which may be easily and efficiently manufactured and marketed.

It is a further object of the present invention to provide a new and improved surfacing tool which is of a durable and reliable construction.

An even further object of the present invention is to provide a new and improved surfacing tool which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved surfacing tool and method of using which provides in the apparatuses and methods of the prior art some of the advantages thereof, while simultaneously overcoming some of the disadvantages normally associated therewith.

Still another object of the present invention is to provide a new and improved surfacing tool for removing projecting imperfections from a painted surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
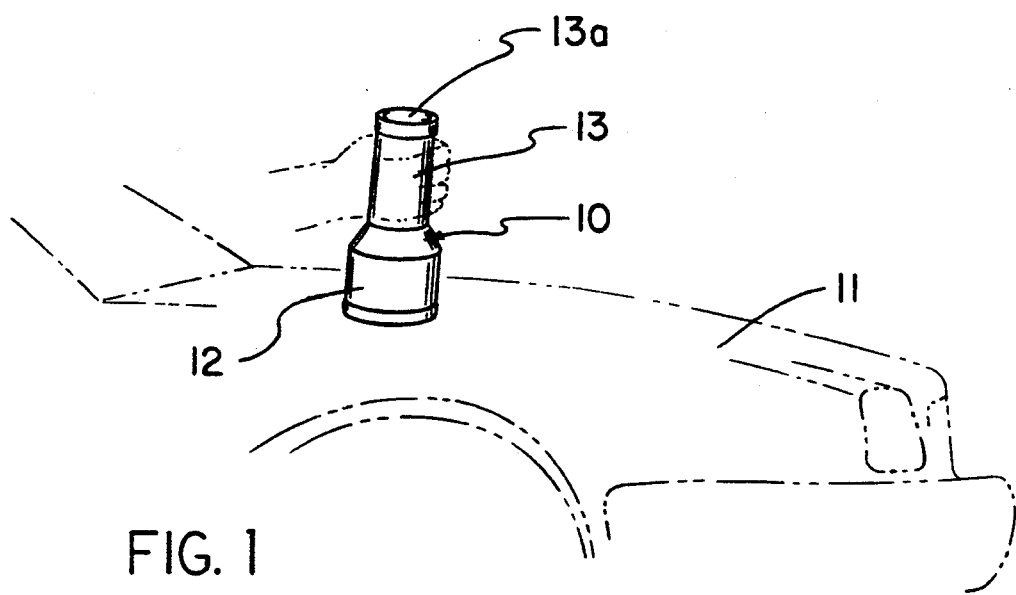
FIG. 1 is a perspective view showing the device of the present invention being applied to the painted surface of a vehicle body.

With reference now to the drawings, and in particular to FIG. 1 thereof, a new and improved surfacing tool and method of using embodying the principles and concepts of the present invention and generally designated by the reference numeral 10 will be described.

More specifically, it will be noted that the device 10 of the present invention comprises a small compact hand-held unit adapted to be applied to the painted surface of a vehicle 11 (shown in broken lines). The device 10 has a base portion 12 in contact with the vehicle 11 and a hand-grip upper portion 13, having a removable cover 13A for access to the interior of device 10.

Figure 2:
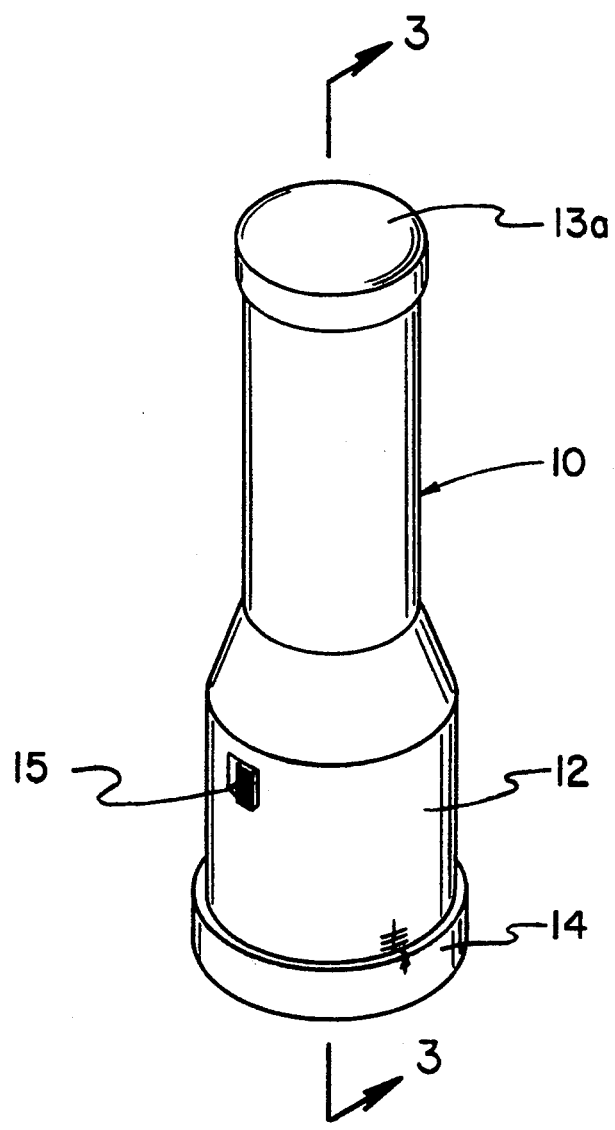
FIG. 2 is a perspective view of the device itself.

FIG. 2 shows device 10 in greater detail. Base portion 12 of such device 10 has an annular collar member 14 extending around such base portion 12 to provide for the relative vertical positioning of the cutter within such base portion 12 as illustrated in the figures described below. An electrical on-off switch 15 on base portion 12 is provided.

Figure 3:
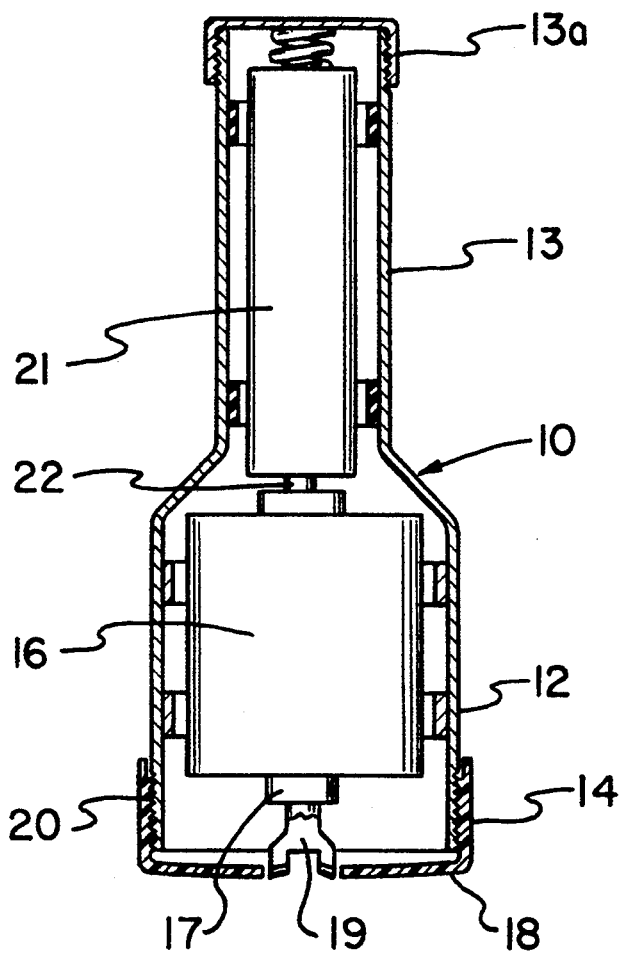
FIG. 3 is a sectional view on line 3—3 of FIG. 2.
Figure 4:
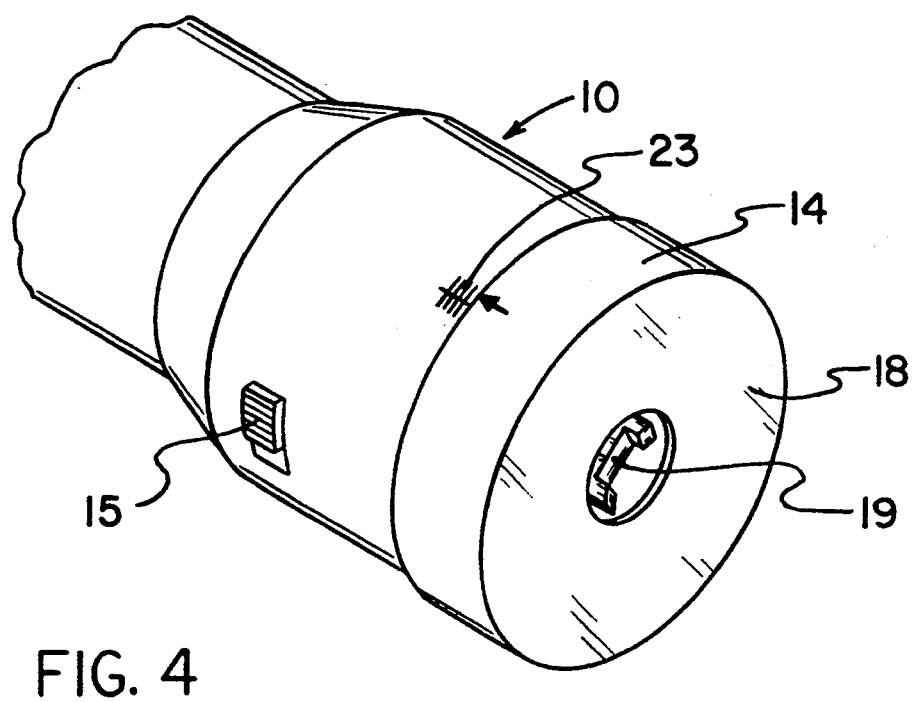
FIG. 4 is a partial side perspective view of the device showing the cutter within the base of the device.

FIG. 3 illustrates the working mechanism of the device 10. Positioned vertically within the base portion housing 12 is a small battery-powered motor 16 having its drive shaft 17 extending downwardly to the base 18 of such housing 12. Secured to drive shaft 17 is a cutter blade 19. The base 18 is part of the annular collar member 14 first illustrated in FIG. 2. Such annular collar member 14 is threadably connected to the housing of base portion 12 as at 20. By rotating such collar member 14 on such threadable connections 20, the base 18 thereof may be moved vertically relative to cutter blade 19 thus controlling the distance cutter blade 19 projects up away from or down from such base 18. In the upper hand-grip portion 13 of device 10, a battery 21 is mounted with its terminal 22 engaging the connection with motor 16. The on-off switch 15 is shown in FIG. 2 and also in FIG. 4. Shown in FIG. 4 is the cutter blade 19 recessed into base 18. Also shown in this view is a level indicator 23 giving a visual indicia reading for the relative positioning of cutter blade 19 and base 18.

Figure 5:
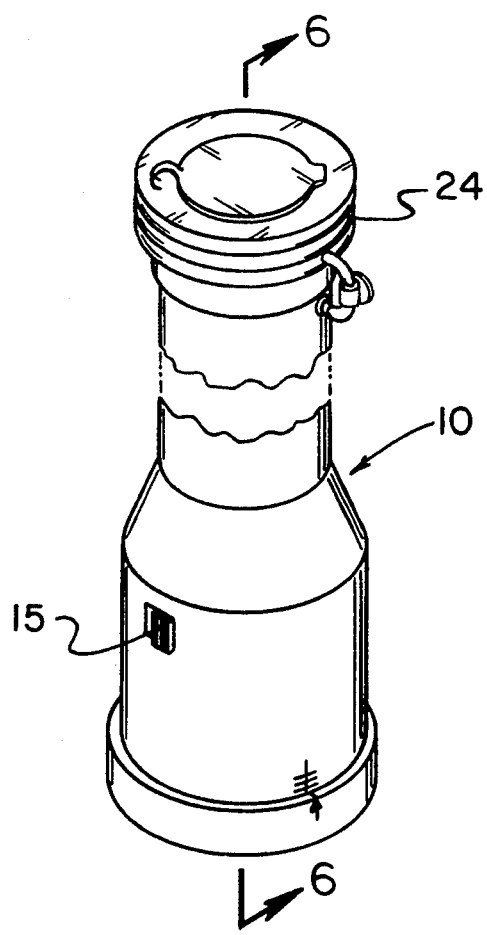
FIG. 5 is a perspective view showing a modification of the device of FIGS. 1 through 4.
Figure 6:
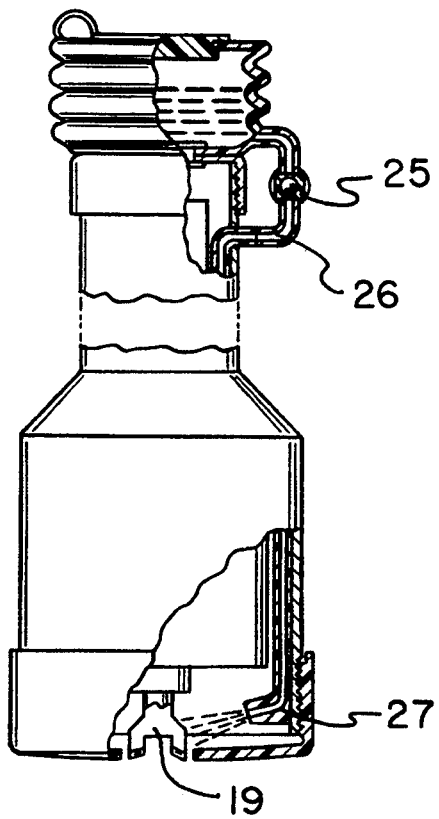
FIG. 6 is a partially-sectional view of the device in FIG. 5.

FIG. 5 shows the device 10 with a modification to permit lubrication of the working surface to which the tool is applied. A lubricant reservoir 24 is mounted atop the hand-grip portion 13 of device 10. An open-shut valve 25 is provided to permit or deny flow of lubricant from reservoir 24. As more clearly shown in FIG. 6, a partially-sectional view on line 6—6 of FIG. 5, the lubricant is fed downward by gravity from reservoir 24 through tubing 26 to a discharge nozzle 27 whence it flows onto the surface in contact with base 18. This will minimize any marking of such surface by base 18 and also serves to flush away particles removed from such surface by cutter blade 19. A solution of mild soap and water has been found to be suitable lubricant for this purpose.

Figure 7:
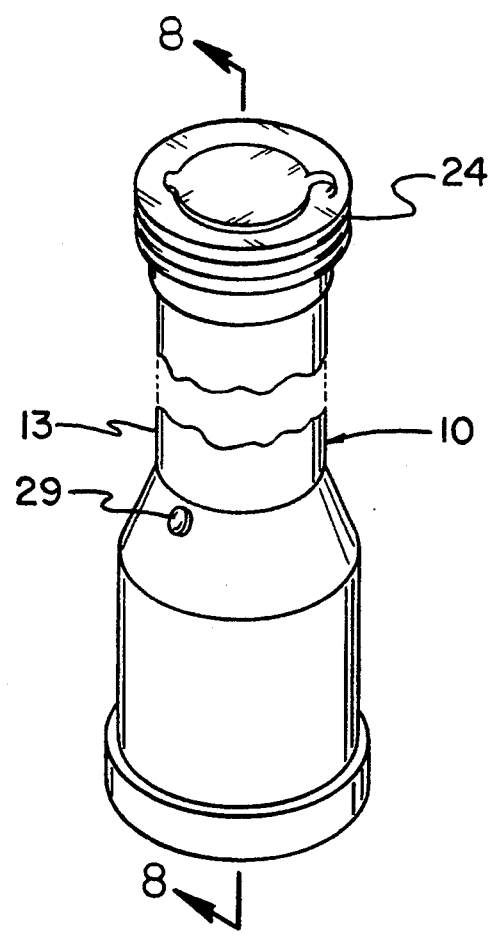
FIG. 7 again shows a perspective view of the device of FIG. 5 from the opposite direction with a different direction for a sectional view therethrough.
Figure 8:
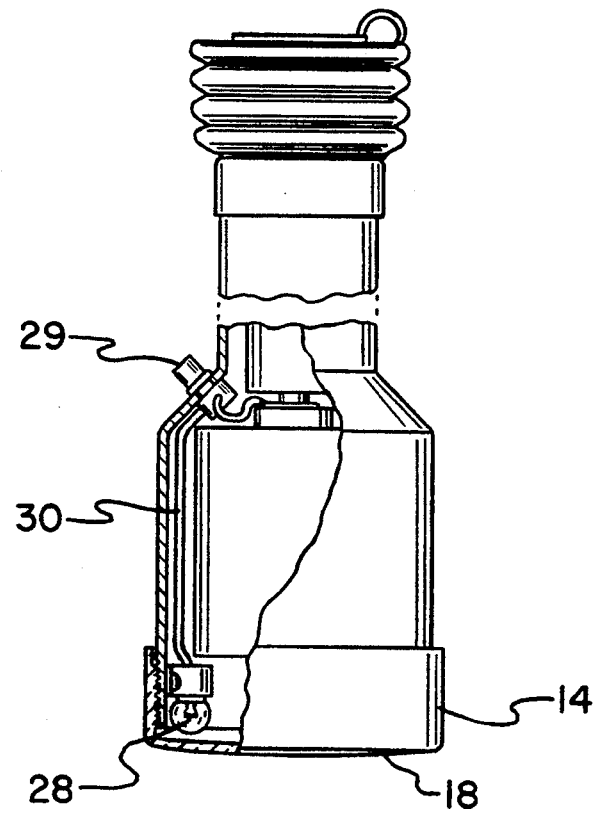
FIG. 8 is a partially-sectional view of the device in FIG. 7 on line 8—8 of FIG. 7.

FIG. 7 and 8 illustrate a further modification, particularly useful with the device 10 illustrated in such figures but also with the simpler construction shown in FIGS. 1 through 4. Here a light source consisting of a small flashlight type bulb 28 is positioned within annular collar member 14 adjacent the base 18 thereof. Bulb 28 is connected to battery 21 through a switch 29 and associated wiring 30. This permits the operator to more clearly see the surface being worked on by the surfacer device 10.

In operation the device is applied to the surface from which protruding imperfections are to be removed after first adjusting the collar 14 to the proper clearance with cutting blade 19. A good way of checking this, which also serves to sharpen the blades of cutter 19, is to press the device 10 on a flat sheet of fine sandpaper having a grit approximating such protruding imperfections. Adjustment of collar 14 to just trim off the tips of such grit will set the clearance at least initially with further adjustment being made as necessary in usage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A surfacing tool for removing imperfections from a painted surface without marring such surface which comprises:
    a tool housing having an upper hand-grip portion and a work-surface contacting base portion including a first portion and an annular collar member;
    a cutter blade;
    a drive motor connected to said cutter blade for rotating said cutter blade about a central axis passing through said tool housing upper portion and said base portion;

said base portion further including adjustment means to advance and retract said cutter blade relative to a work-contacting surface of said base portion;

wherein said adjustment means comprises threads on an end of said first portion remote from said hand grip portion and threads on said annular collar member such that said annular collar member is threadably engaged with and extends around said first portion, said collar member having said work-contacting surface at a bottom thereof and a cutter blade exposing opening in the center thereof through which said cutter blade extends;

wherein said housing upper hand-grip portion is hollow and defines a first enclosed space, with said housing upper hand-grip portion having an exterior diameter of a first transverse extent;

a battery disposed in said first enclosed space;

wherein said housing base portion is hollow and defines a second enclosed space, with said first portion of said housing base portion having an exterior diameter of a second transverse extent;

said drive motor and said cutter blade being disposed in said second enclosed space; and wherein said first transverse extent is less than said second transverse extent such that said first transverse extent defines a gripping means for gripping the tool during operation;

and further comprising a light source means for illuminating a work surface, said light source means being provided adjacent said annular collar member and internal of said second enclosed space.

* * * * *